US006754369B1

(12) United States Patent
Sazawa

(10) Patent No.: US 6,754,369 B1
(45) Date of Patent: Jun. 22, 2004

(54) LICENSE PLATE READING APPARATUS AND METHOD

(75) Inventor: Shinichi Sazawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 536 days.

(21) Appl. No.: 09/722,345

(22) Filed: Nov. 28, 2000

(30) Foreign Application Priority Data

Mar. 24, 2000 (JP) ........................................ 2000-083370

(51) Int. Cl.[7] .............................................. G06K 9/00
(52) U.S. Cl. ..................................................... 382/105
(58) Field of Search ................................ 382/104, 107, 382/159, 161, 198, 218, 229, 105; 340/905, 910, 936, 146.2; 434/305

(56) References Cited

U.S. PATENT DOCUMENTS

| | | | | |
|---|---|---|---|---|
| 5,381,155 A | * | 1/1995 | Gerber ........................ | 342/104 |
| 5,554,984 A | * | 9/1996 | Shigenaga et al. ........... | 340/937 |
| 5,734,337 A | * | 3/1998 | Kupersmit ................... | 340/937 |
| 5,742,699 A | * | 4/1998 | Adkins et al. ............... | 382/107 |
| 5,805,209 A | * | 9/1998 | Yuge et al. .................. | 348/149 |
| 5,809,161 A | * | 9/1998 | Auty et al. .................. | 382/104 |
| 5,948,038 A | * | 9/1999 | Daly et al. ................... | 701/117 |
| 6,140,941 A | * | 10/2000 | Dwyer et al. ................ | 340/928 |
| 6,573,929 B1 | * | 6/2003 | Glier et al. .................. | 348/149 |
| 6,587,586 B1 | * | 7/2003 | Cui et al. .................... | 382/176 |

FOREIGN PATENT DOCUMENTS

JP 3-265985 11/1991 ............ G06K/9/20

* cited by examiner

*Primary Examiner*—Andrew W. Johns
*Assistant Examiner*—Shervin Nakhjavan
(74) *Attorney, Agent, or Firm*—Staas & Halsey LLP

(57) ABSTRACT

A running vehicle is photographed at a predetermined frame period by an image pickup unit (TV camera) provided at a position above a road. Two images of a present frame image and a previous frame image which were photographed are successively stored in an image storing unit. A vehicle detecting unit detects a motion of a license plate in a head portion of the running vehicle on the basis of the present frame image and the previous frame image stored in the image storing unit. A character recognizing unit recognizes all of the characters on the license plate on the basis of a dictionary in which character images of all of the characters used for the license plate have been registered and an image in a license plate area detected by the vehicle detecting unit by collating with the character images registered in the dictionary.

8 Claims, 15 Drawing Sheets

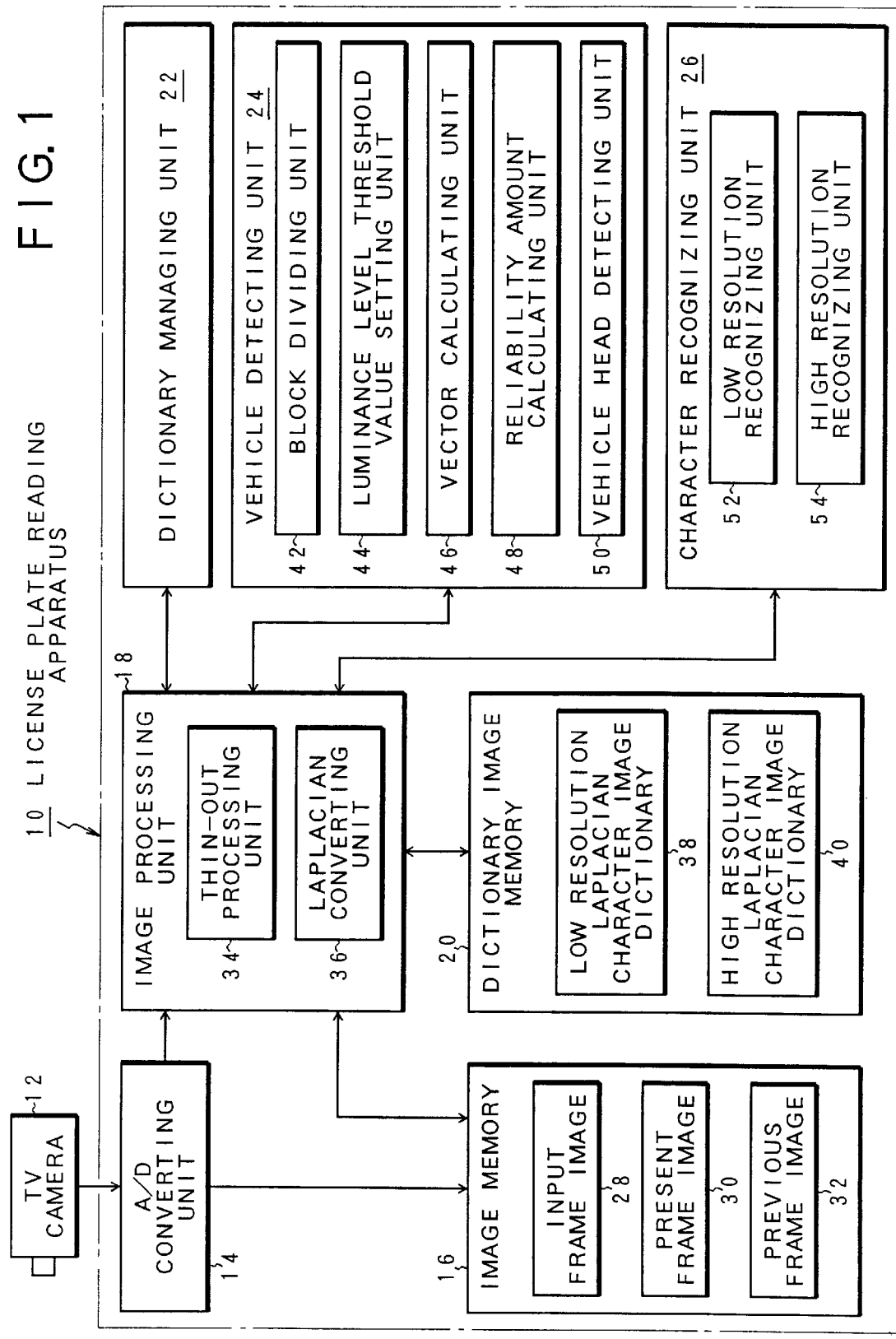

F I G. 2
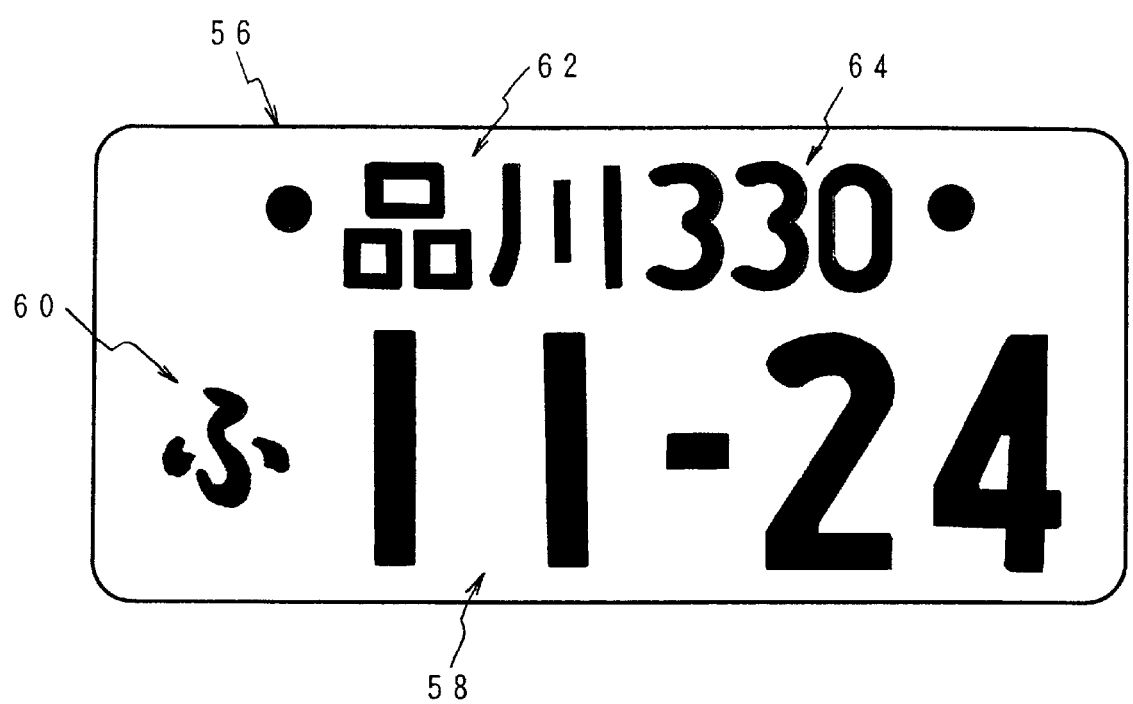

F I G. 3
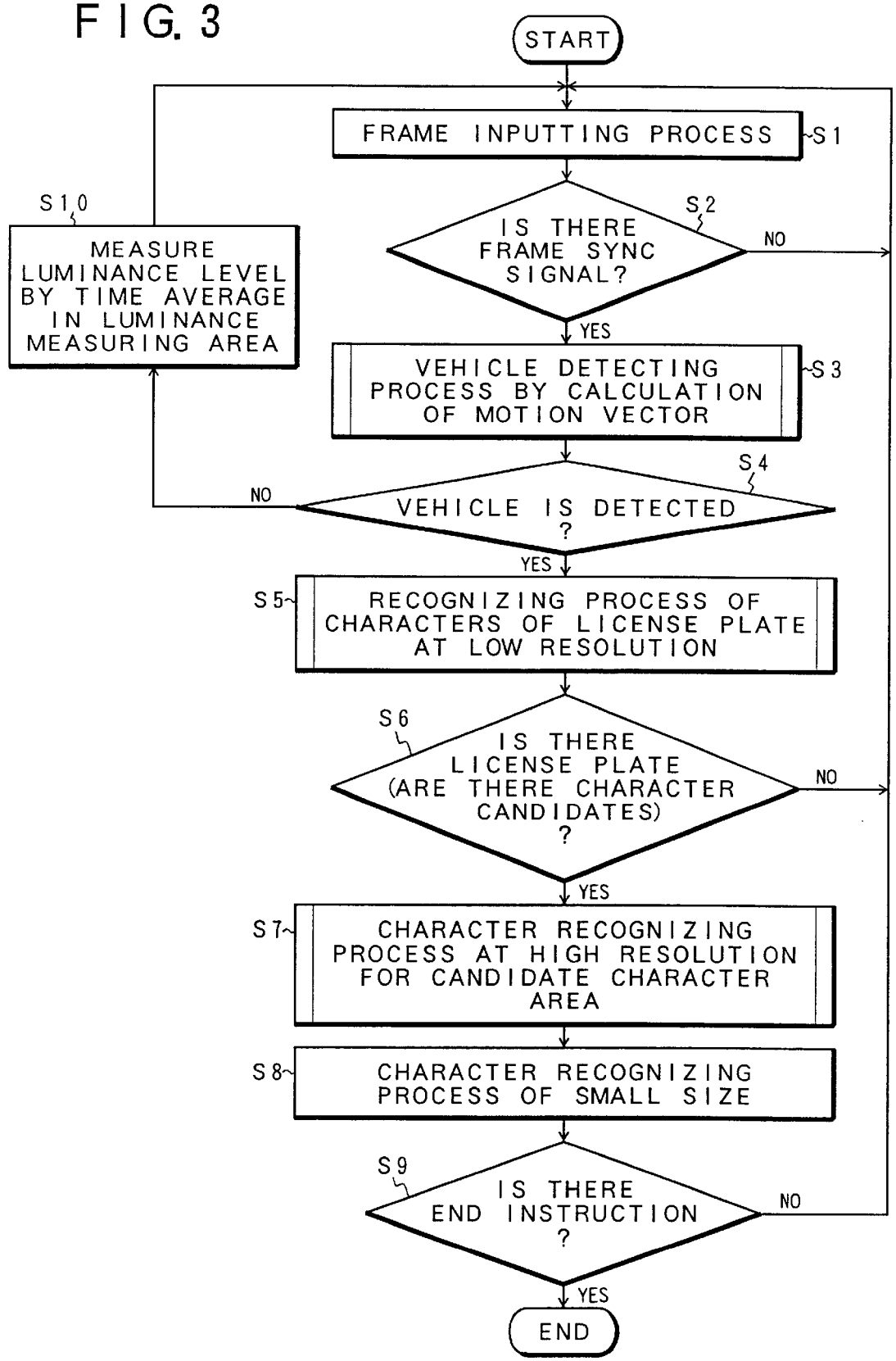

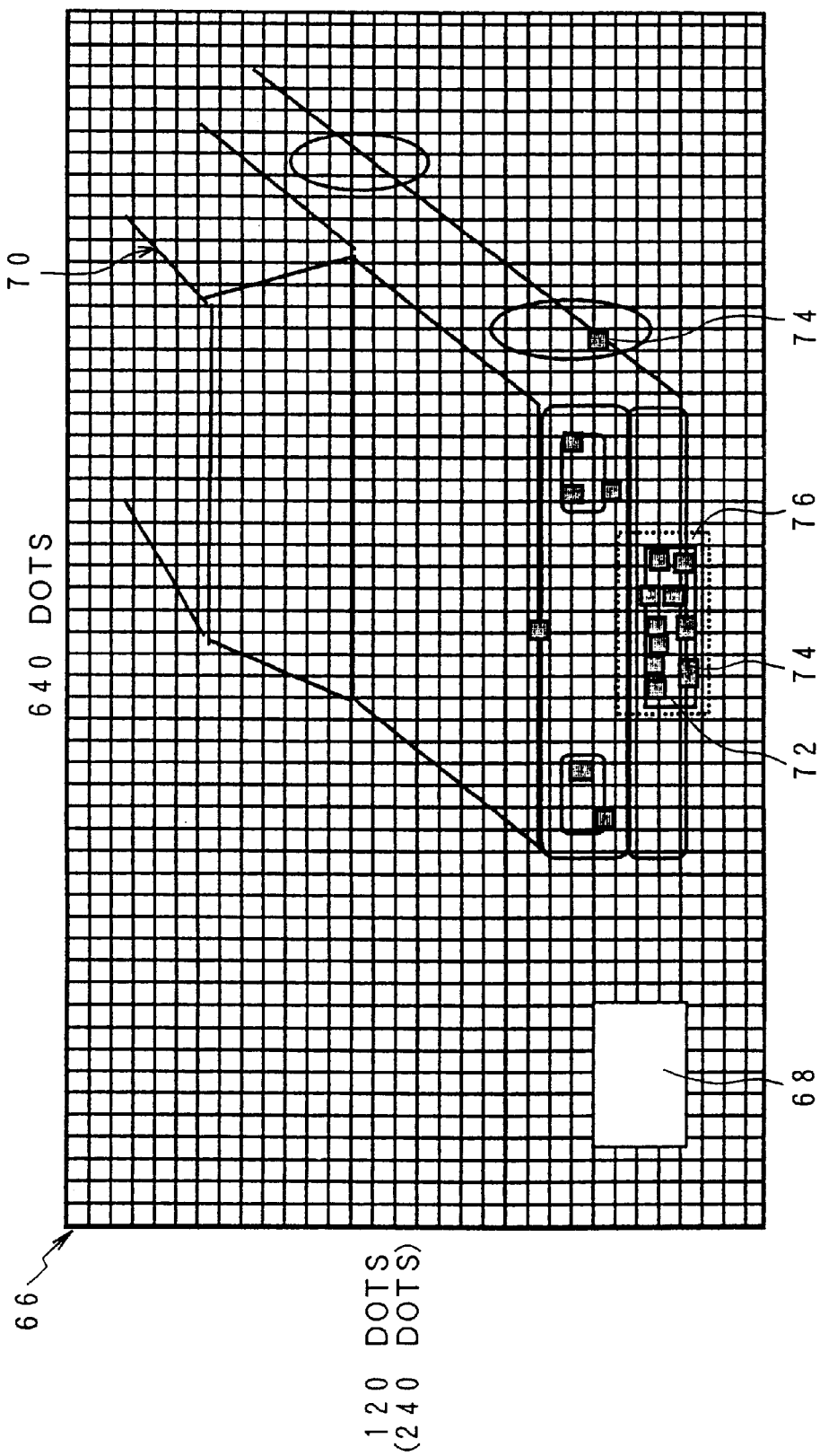

| | 90 | | | 92 CORE | | | |
|---|---|---|---|---|---|---|---|
| | -1/48 | -1/48 | -1/48 | -1/48 | -1/48 | -1/48 | -1/48 |
| | -1/48 | -1/48 | -1/48 | -1/48 | -1/48 | -1/48 | -1/48 |
| | -1/48 | -1/48 | -1/48 | -1/48 | -1/48 | -1/48 | -1/48 |
| | -1/48 | -1/48 | -1/48 | 1 | -1/48 | -1/48 | -1/48 |
| | -1/48 | -1/48 | -1/48 | -1/48 | -1/48 | -1/48 | -1/48 |
| | -1/48 | -1/48 | -1/48 | -1/48 | -1/48 | -1/48 | -1/48 |
| | -1/48 | -1/48 | -1/48 | -1/48 | -1/48 | -1/48 | -1/48 |

| 96 | | | 98-1 | 98-2 | | |
|---|---|---|---|---|---|---|
| -1/19 | -1/19 | -1/19 | -1/19 | -1/19 | -1/19 | -1/19 |
| -1/19 | -1/19 | -1/19 | 1/2 | 1/2 | -1/19 | -1/19 |
| -1/19 | -1/19 | -1/19 | -1/19 | -1/19 | -1/19 | -1/19 |

FIG. 10
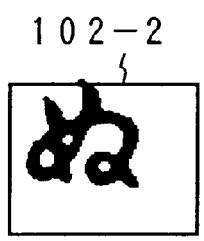
102-2
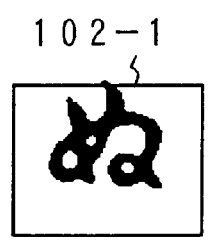
102-1
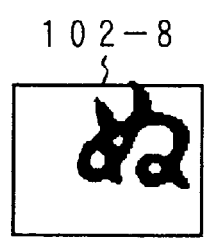
102-8
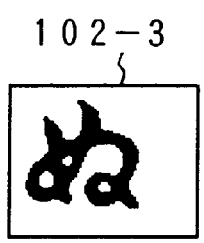
102-3
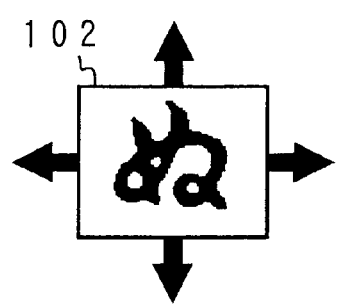
102
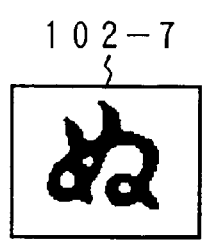
102-7
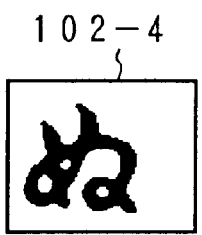
102-4
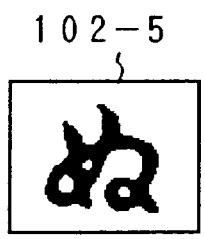
102-5
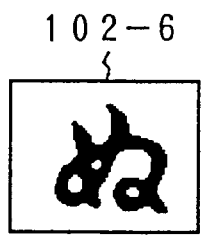
102-6

F I G. 1 2
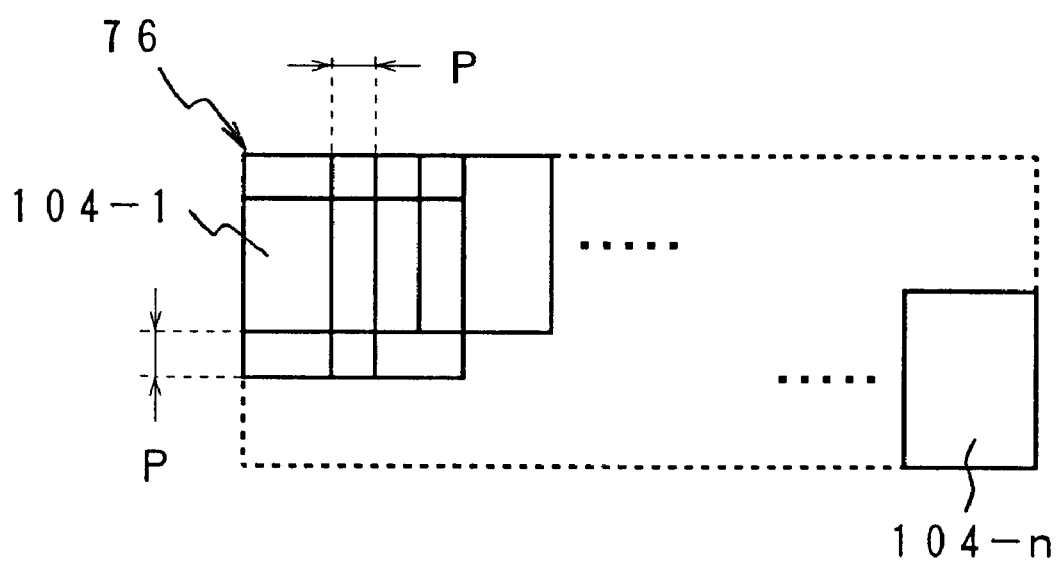

F I G. 1 5 A
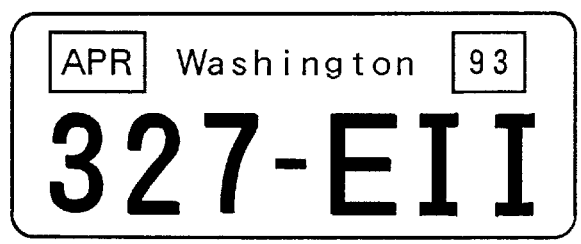
F I G. 1 5 B
F I G. 1 5 C
F I G. 1 5 D

LICENSE PLATE READING APPARATUS AND METHOD

BACKGROUND OF THE INVENTION

1. Field of the Invention

The invention relates to license plate reading apparatus and method for recognizing a license plate by an image of a vehicle photographed on a road. More particularly, the invention relates to license plate reading apparatus and method for automatically detecting a running vehicle from information of an image photographed by one television camera and reading characters on the license plate at a high precision.

2. Description of the Related Arts

In recent years, a system for recognizing a license plate of a vehicle running a road has socially played an important role. Therefore, there has been developed a system in which a TV camera is put on a road and a license plate of a vehicle is recognized from a photographed image. A license plate reading apparatus has to satisfy two requirements such that, first, all running vehicles can be detected without missing a detection, and second, the license plate of the detected vehicle is correctly read. As a conventional technique for this purpose, for example, there is an apparatus disclosed in JP-B-2893814. In such an apparatus, a head of a running vehicle is detected by extracting an edge of an image. A license plate is read by a method of binarizing the image by a background difference.

However, the method of detecting the vehicle head of the running vehicle by extracting the edge of the image has a drawback such that the vehicle head is easily erroneously discriminated as a shadow of the vehicle, a reflection of headlights, or the like. Also a method of reading a license plate by binarizing an image by a background difference has a problem such that it is difficult to avoid an adverse influence on conditions of external illuminance and a reading precision is low. In order to read the license plate of the vehicle at a high precision, it is necessary to raise a resolution of characters. However, to keep the high resolution, it is necessary to use a plurality of cameras or use a camera of a high resolution, so that the costs become very high. Therefore, in case of using an ordinary TV camera, a passing position such as a gate or the like of the vehicle is extremely limited and the system is limited to an application in which the position of the license plate has been fixed on the image. Therefore, it is difficult to read the license plate of the vehicle which is running a road at a high precision by using the ordinary TV camera.

SUMMARY OF THE INVENTION

According to the invention, there are provided license plate reading apparatus and method for certainly detecting a running vehicle from an image of a relatively low resolution photographed by one camera and reading a license plate from the detected image at a high precision.

A license plate reading apparatus of the invention comprises: an image pickup unit (TV camera) which is set above a road and photographs a running vehicle at a predetermined frame period; an image storing unit for successively storing two images of a present frame image and a previous frame image which were photographed by the image pickup unit; a vehicle detecting unit for detecting a motion of a license plate in a head portion of the running vehicle on the basis of a difference between the present frame image and the previous frame image which were stored in the image storing unit; a dictionary in which character images of all characters used for the license plate have been registered; and a character recognizing unit for recognizing all of the characters of the license plate from an image in a license plate area detected by the vehicle detecting unit by correlating with the registered character images in the dictionary. Therefore, even for a video image photographed by one camera by a sight of about two times as wide as a width of an ordinary vehicle, the license plate can be recognized at a high precision.

The vehicle detecting unit comprises: a block dividing unit for dividing each of the present frame image and the previous frame image into blocks of a predetermined pixel size; a vector calculating unit for obtaining a pixel position, as a block moving position, where a sum of differences between each pixel in the block of the previous frame and all pixels in the blocks of the present frame is equal to a minimum value bg, thereby calculating a motion vector of the block; and a vehicle head detecting unit for scanning all of the blocks, searching a group of blocks in which sizes and directions of the motion vectors are almost the same in an area of a rectangular size corresponding to the license plate, detecting the vehicle on the basis of the presence or absence of the group of blocks which satisfy such conditions, and at the same time, detecting a license plate area of the vehicle head. Since the vehicle detection is performed by paying attention only to the motion of the license plate in the image of the running vehicle as mentioned above, the vehicle can be accurately detected without being influenced by an image other than the license plate.

Further, in order to improve the detecting precision of the vehicle, the vehicle detecting unit can also have: a block dividing unit for dividing each of the present frame image and the previous frame image into blocks of a predetermined pixel size; a luminance level threshold value setting unit for always measuring a luminance of a predetermined area on the road in the frame image, discriminating statistical external illuminance state by obtaining an average value of a predetermined time, and obtaining and setting a luminance level threshold value (bg_th) which monotonously increases in accordance with the illuminance state by a predetermined simple increasing curve; a vector calculating unit for obtaining a pixel position, as a block moving position, where a sum of a difference between each pixel in the block of the previous frame and all pixels in the block of the present frame is equal to the minimum value (bg), thereby calculating a motion vector of the block; a reliability amount calculating unit for calculating a motion vector reliability amount (bgm) by subtracting a sum (bg0) of a difference between each pixel in the block of the present frame and all pixels in the block of the previous frame from the minimum difference value (bg) calculated by the vector calculating unit; and a vehicle head detecting unit for scanning all blocks, searching a group of blocks in which sizes and directions of the motion vectors are almost the same and the reliability amount (bgm) is equal to or larger than the luminance level threshold value (bg_th) in an area of a rectangular size corresponding to a license plate, detecting a vehicle on the basis of the presence or absence of the group of blocks which satisfy those conditions, and at the same time, detecting a license plate area at the head of the vehicle. As mentioned above, by always measuring the luminance level of a part of the image, setting the difference of a correlation result between the image and the position where the motion is equal to zero to the reliability amount of the vector, and discriminating the motion from a shadow and noises of the vehicle, the vehicle and its license plate area can be detected accurately from the image.

The character recognizing unit comprises: a low resolution recognizing unit for recognizing a character at a position of the character having the largest size on the license plate with respect to the frame image of a low resolution obtained by thinning out the original image as a target; and a high resolution recognizing unit for returning the resolution of the frame image to the original resolution, recognizing the character at the character position recognized by the low resolution recognizing unit, and recognizing a character at a position of another small character on the license plate in which a relative position has previously been known on the basis of a character recognition result. As mentioned above, by performing the recognition of two stages such that the character recognition of the license plate is performed with respect to the image of a low resolution, as a target, obtained by thinning out the pixels from the image in which the vehicle head has been detected and with respect to candidate positions thus obtained, the resolution is returned to the original resolution and the character recognition is performed, the reading at a high speed and a high precision is realized.

In the dictionary which is used for the character recognition, each of a sample character image obtained by photographing each character which is used for the license plate and a sample character image obtained by thinning out the above sample character image to the image as that of the low resolution recognizing unit is reduced to a size corresponding to the size of the character image at the time of reading the license plate, thereafter, converted into a Laplacian character image by applying a Laplacian filter, and registered into the dictionary. Each of the low resolution recognizing unit and high resolution recognizing unit applies the Laplacian filter to the inputted character image and converts and, thereafter, performs a normalization correlation arithmetic operation between the converted image and the Laplacian character image of the corresponding resolution which has been registered in the dictionary, thereby recognizing the characters of the license plate. The image having the highest correlation degree can be set to the collation result by the normalization correlation calculation between the dictionary character image converted by applying the Laplacian filter and the input character image, and the character recognition can be performed at a high precision.

The high resolution recognizing unit calculates an average value of the luminance of a background portion of the license plate, calculates an accumulation average value for a predetermined time, predicts an external illuminance, and when the accumulation average value is equal to or less than a predetermined threshold value, performs a contrast correction for improving the luminance of the character image to a predetermined level, and performs the character recognition of the license plate. Therefore, even if the ambient brightness decreases, the contrast of the license plate image is automatically improved, thereby improving the character recognizing precision in nighttime or the like. As for the dictionary which is used for the character recognition, further, as dictionary character images of the characters of small sizes used for the license plate, a plurality of kinds, for example, nine kinds of shift character images are formed by shifting the photographed sample character image in the vertical, lateral, and oblique directions and reduced to a size corresponding to the size of the character image at the time of reading the license plate, and thereafter, the images are converted into the Laplacian character images by applying the Laplacian filter and registered into the dictionary. By registering the images obtained by shifting the sample character in the lateral, oblique, and vertical directions as mentioned above into the dictionary, a fine sampling error at the low resolution caused by photographing the image by the ordinary TV camera is absorbed and the characters are recognized at a high precision.

Further, when the sample character is registered into the dictionary, the dictionary image is formed by selecting the Laplacian filter having a structure in which each size and/or the vertical/lateral sizes have been determined in correspondence to the kind (Hiragana, Kanji, or small number) of character of a small size used in the license plate. The high resolution recognizing unit selects the Laplacian filter of each character font used in the dictionary formation and recognizes the characters of the input character image. Therefore, the recognition at the low resolution can be performed at a high precision in accordance with the character kind.

According to the invention, there is provided a license plate reading method comprising:

a dictionary forming step of forming a dictionary in which character images of all characters which are used on a license plate have been registered;

an image pickup step of photographing a running vehicle at a predetermined frame period from a position above a road;

an image memory step of successively storing two images of a present frame image and a previous frame image photographed in the image pickup step;

a vehicle detecting step of detecting a motion of the license plate in a front portion of the running vehicle on the basis of a difference between the present and previous frame images stored in the image memory step; and a character recognizing step of recognizing all characters of the license plate from an image in a license plate area detected in the vehicle detecting step by collating them with registration character images in the dictionary.

The details of the license plate reading method are substantially the same as those in case of the apparatus construction.

The above and other objects, features, and advantages of the present invention will become more apparent from the following detailed description with reference to the drawings.

BRIEF DESCRIPTION OF THE DRAWINGS

FIG. 1 is a block diagram of an apparatus construction according to the invention;

FIG. 2 is an explanatory diagram of a Japanese license plate which is read in the invention;

FIG. 3 is a flowchart for a license plate reading process in FIG. 1;

FIG. 4 is an explanatory diagram of an image process of a vehicle detection according to the invention;

FIG. 10 is an explanatory diagram of a shift character which is used for dictionary formation of a Hiragana of the small size of the license plate;

FIG. 12 is an explanatory diagram of an arrangement of character size blocks in which a normalization correlation arithmetic operation is performed in a license plate area of a target image;

FIGS. 15A to 15D are explanatory diagrams of license plates of U.S.A., Germany, Sweden, and Korea.

DETAILED DESCRIPTION OF THE PREFERRED EMBODIMENT

Figure 5A:
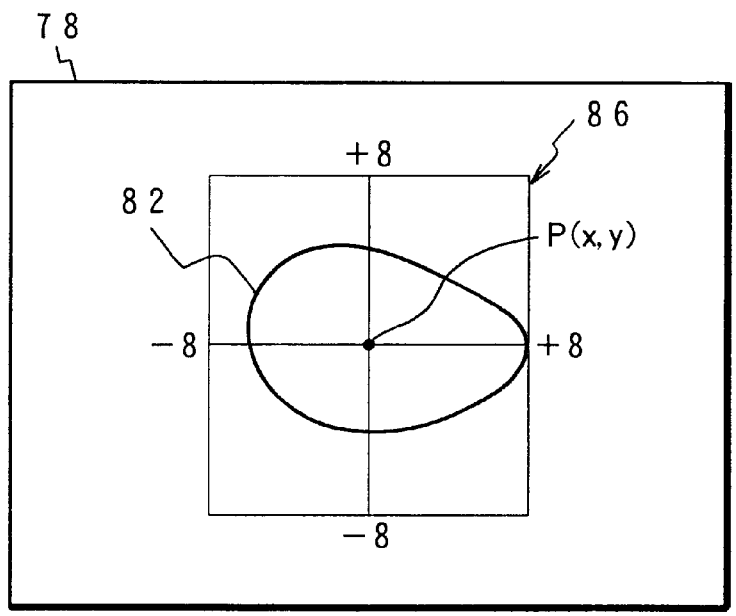
FIGS. 5A and 5B are explanatory diagrams of a motion vector according to the invention.

FIG. 1 is a block diagram showing an embodiment of a license plate reading apparatus according to the invention. According to a license plate reading apparatus 10 of the invention, a vehicle which is running a road is photographed as a motion image by a TV camera 12 and fetched. As a TV camera 12, it is possible to use a camera for photographing an image of a relatively low resolution such that a resolution of one frame image is equal to, for example, 240 dots (in the vertical direction)×640 dots (in the lateral direction). The license plate reading apparatus 10 has an A/D converting unit 14, an image memory 16, an image processing unit 18, a dictionary image memory 20, a dictionary managing unit 22, a vehicle detecting unit 24, and a character recognizing unit 26. The A/D converting unit 14 converts an image signal from the TV camera 12 which is photographing the road into digital data and inputs it to the image memory 16. A frame image is stored in the image memory 16 every frame period of the TV camera 12. Specifically speaking, an input frame image 28 in which a frame image signal that is being inputted at present has been stored, a latest present frame image 30 which has already been inputted, and a previous frame image 32 corresponding to one previous frame have been stored. With respect to the present frame image 30 and previous frame image 32 among them, besides the frame image which was directly inputted from the TV camera 12, an image subjected to a filtering process by the image processing unit 18 or an image subjected to a thinning process by the unit 18 is also stored as necessary. According to the embodiment, a thin-out processing unit 34 and a Laplacian converting unit 36 are provided for the image processing unit 18. For the purpose of vehicle detection of the vehicle detecting unit 24, the thin-out processing unit 34 forms a frame image of a low resolution of, for example, 240 dots (in the vertical direction)×640 dots (in the lateral direction) obtained by thinning out each of the present frame image 30 and previous frame image 32 in the image memory 16. As will be obviously explained hereinlater, the Laplacian converting unit 36, forms an image in which a conversion by a Laplacian filter has been performed to each pixel in the frame image and uses the image for a character recognition in the character recognizing unit 26. Also at the time of a dictionary registration in the dictionary image memory 20, a Laplacian conversion is performed with respect to a sample character image and the converted image is registered in a dictionary. According to the embodiment, a low resolution Laplacian character image dictionary 38 and a high resolution Laplacian character image dictionary 40 have been stored in the dictionary image memory 20. The low resolution Laplacian character image dictionary 38 is used as a dictionary for character recognition of numbers of a large size displayed on the license plate. The high resolution Laplacian character image dictionary 40 is used as a dictionary for character recognition of a Hiragana, a Kanji, and a Katakana other than the numbers of the large size written on the license plate. At a preparation stage prior to using the license plate reading apparatus 10, the dictionary managing unit 22 performs a managing process of a dictionary such that a clear sample character is photographed by, for example, the TV camera 12 and fetched as a sample character image, the Laplacian conversion is performed to the sample character image by the Laplacian converting unit 36 of the image processing unit 18, and the converted image is stored as a low resolution Laplacian character image dictionary 38 or high resolution Laplacian character image dictionary 40 into the dictionary image memory 20. A block dividing unit 42, a luminance level threshold value setting unit 44, a vector calculating unit 46, a reliability amount calculating unit 48, and a vehicle head detecting unit 50 are provided for the vehicle detecting unit 24. Among them, the least function necessary for the vehicle detection of the vehicle detecting unit 24 is constructed by the block dividing unit 42, vector calculating unit 46, and vehicle head detecting unit 50. The luminance level threshold value setting unit 44 and reliability amount calculating unit 48 other than those units are provided for high precision detection to prevent an erroneous detection caused by the image of the vehicle or a shadow of the vehicle. According to a fundamental vehicle detecting function by the vehicle detecting unit 24, with regard to the present frame image 30 and previous frame image 32 stored in the image memory 16, each frame image is divided into predetermined small blocks, for example, subblocks of a size of 8×8 dots by the block dividing unit 42 with respect to the frame image of the low resolution which was thinned out by the thin-out processing unit 34 of the image processing unit 18. Subsequently, a difference process of the previous and present frames is performed every block and a position where a difference amount is the minimum is obtained, thereby calculating the presence or absence of a motion of the subblock and a vector of the motion by the vector calculating unit 46. Finally, in the vehicle head detecting unit 50, all blocks after completion of the process of the vector calculating unit 46 are operated, a group of blocks in which sizes and directions of the motion vectors are almost equal in the area of the rectangular size corresponding to the license plate is searched, the vehicle is detected on the basis of the existence of the group of blocks which satisfy such a condition, and at the same time, the license plate area at the head of the vehicle is detected. The character recognizing unit 26 has a low resolution recognizing unit 52 and a high resolution recognizing unit 54.

A Japanese license plate serving as a target of the license plate reading apparatus 10 in FIG. 1 is, for example, as shown in FIG. 2. A license plate 56 displays numerals of a large size of four digits such as "11–24" as license plate numerals 58. When the numeral on the head side is equal to "0", "•" is used as license plate numerals of four digits. For example, license plate numerals "00–05" are displayed as "•••–•5". An application code 60 is displayed by Hiragana such as "ふ" at the head of the license plate numerals 58. As a land transportation branch office code 62, for example, "品川" is displayed above the license plate numerals 58. Subsequently, for example, "330" showing an ordinary automobile is displayed as a vehicle type code 64. As mentioned above, as for the license plate 56, the license plate numerals 58 are numerals each having a large size and the application code 60, land transportation branch office code 62, and vehicle type code 64 each having a small size are displayed as small characters around the license plate numerals 58.

The low resolution recognizing unit 52 provided in the character recognizing unit 26 in FIG. 1 performs the recognition with respect to an image of a low resolution obtained by thinning out each of the numerals "0 to 9" of the license plate numerals 58 of the large size on the license plate 56 in FIG. 2 as a target. That is, since a license plate area in the thinned-out present frame image has been recognized in the detecting process by the vehicle detecting unit 24, with respect to the image in which the Laplacian conversion has been performed to the license plate area, a collating process of the license plate numerals is performed on the basis of a normalization correlation arithmetic operation using the low resolution Laplacian character image dictionary 38 in the dictionary image memory 20. Since the size of numerals of four digits of the license plate numerals is relatively large as shown in FIG. 2, even in case of the low resolution image obtained by thinning out the present frame image at regular intervals, any candidate characters of the numerals of four digits can be recognized by the normalization correlation arithmetic operation with the dictionary image. In this case, if the maximum correlation value of the candidate characters is equal to or less than a predetermined value, it is determined that the image is an image including no license plate. The recognizing process regarding this image is stopped. The high resolution recognizing unit 54 restores the thinned-out image to the original image with respect to the image of the candidate characters of four digits of the license plate numerals recognized by the low resolution recognizing unit 52 and performs the character recognizing process at a high resolution by the normalization correlation arithmetic operation with the high resolution Laplacian character image dictionary 40 in the dictionary image memory 20, thereby recognizing the numerals of four digits of the license plate numerals. Further, since the relative positional relation among the application code 60, land transportation branch office code 62, and vehicle type code 64 for the license plate characters 58 has been predetermined as shown in the license plate 56 in FIG. 2, the high resolution recognizing unit 54 extracts the characters of Hiragana, Kanji, and numerals of a small size from the image by using the relative positional relation on the basis of the recognition result of the numerals of four digits of the license plate numerals, and recognizes the application code, land transportation branch office code, and vehicle type code on the license plate by the normalization correlation arithmetic operation with the high resolution Laplacian character image dictionary 40 in the dictionary image memory 20.

FIG. 3 is a flowchart for the reading process of the license plate reading apparatus 10 in FIG. 1. First, in step Si, with respect to digital data of an image which has been photographed by the TV camera 12 and is inputted from the A/D converting unit 14, a frame inputting process for writing digital data into an area of the input frame image 28 in the image memory 16 is performed. If a frame sync signal is detected in step S2 during the writing operation of the input frame image 28, it is determined that the writing operation of the input frame image 28 has been completed. The input frame image 28 is replaced with the present frame image 30, the previous frame image 32 is erased, and the present frame image 30 is replaced with the previous frame image 32.

Subsequently, in step S3, the present frame image 30 and previous frame image 32 are thinned out by the image processing unit 18 and, thereafter, Laplacian converted by the Laplacian converting unit 36. The Laplacian converted present frame image 30 and previous frame image 32 are used as targets and divided into subblocks by the vehicle detecting unit 24. After that, a difference between the previous frame and the present frame of each block is obtained and the position at which the difference amount becomes the minimum is obtained, thereby discriminating the presence or absence of the motion of the subblock, calculating a motion vector, detecting the vehicle on the basis of the motion vector, and detecting the license plate area. In step S4, if the motion of the subblock in the area corresponding to the license plate can be detected, the processing routine advances to the character recognizing process of the license plate at a low resolution in step S5. If the motion of the subblock in the area corresponding to the license plate is not detected in step S4, this means that the vehicle is not detected. Therefore, the processing routine is returned to the frame inputting process in step S1 through a process for measuring a luminance level in step S10. In step S10, the luminance level at a time average in a luminance measuring area is measured. A result of the luminance level measurement is used for the character recognizing process of the license plate at the low resolution in step S5. In the character recognizing process of the license plate characters at the low resolution in step S5, the numerals of four digits of the license plate numerals of the large size are recognized by the normalization correlation arithmetic operation with the dictionary image by the character recognizing unit provided in the character recognizing unit 26 with regard to the license plate area recognized by the vehicle detecting process. With respect to a processing result of the recognizing process of the license plate characters at the low resolution, if there is at least one character recognition candidate of the numerals of the four license plate numbers in step S6, it is determined that the license plate exists. The character recognizing process at a high resolution for the candidate character area in step S7 is performed. That is, the resolution of the candidate character image recognized at the low resolution is restored to the original resolution. The numerals of a large size of the license plate numerals are recognized by the normalization correlation arithmetic operation with the dictionary image corresponding to the high resolution. Subsequently, in step S8, a relative extraction value of another small license plate character for the recognition result of the license plate numerals is recognized, the character image is extracted, and the character recognition of Hiragana, Kanji, and numerals showing the application code, land transportation branch office code, and vehicle type code on the license plate by the normalization correlation arithmetic operation with the dictionary resolution is performed. Finally, until there is an end instruction in step S9, the recognizing process for the motion image input of the license plate in steps S1 to S8 is repeated in a real-time manner. Subsequently, the vehicle detecting process in step S3, the recognizing process at the low resolution in step S5, the character recognizing process at the high resolution in step S7, and further, the character recognizing process of the characters of a small size shown in the flowchart of FIG. 3 will be described in detail, respectively.

FIG. 4 is an explanatory diagram of the frame image regarding the vehicle detecting process in the invention. A head portion of the license plate of a vehicle 70 which is located at a start point where it passes through a photographing area of the TV camera 12 is displayed on a present frame image 66. A license plate 72 is attached to the head of the vehicle 70. With respect to the present frame image 66, first, a predetermined area on the screen, for example, a rectangular area at the lower left corner is set to a luminance measuring area 68. A luminance of the image is measured in the luminance measuring area 68 with respect to each frame. As shown in the flowchart of FIG. 3, if the vehicle is not detected, the time average in the luminance measuring area 68 is measured as a luminance level in step S10. This luminance level is further converted by a predetermined linear increasing function and a luminance level (bg_th) is calculated. For example, a simple increasing curve obtained experimentally is used as a linear increasing function which is used for conversion of the luminance level. The vehicle detecting process for detecting the vehicle by dividing the present frame image and difference frame image according to the invention into the subblocks is executed as follows. The present frame image 66 in FIG. 4 is converted into the image of a low resolution comprising 120 dots (in the vertical direction)×640 dots (in the lateral direction) by, for example, alternately thinning out in the vertical direction the image of 240 dots (in the vertical direction)×640 dots (in the lateral direction) which was first stored. A correlation arithmetic operation of a difference between the present frame image 30 and previous frame image 32 which were thinned out as mentioned above is performed. Assuming that the size of one subblock is equal to 8×8 dots, the present frame image 66 in FIG. 4 is divided into (N×M=15×80) subblocks. A minimum value bg among the sums of the differences between each pixel of the subblock of a present frame image A and a previous pixel of the subblock of a previous frame image B is calculated by the following equation.

$$bg = MIN(\Sigma |A(x+a, y+b) - B(x, y)|) \quad (1)$$

where, the sum $\Sigma$ is concerned with all of the pixel positions (x, y) in the subblock.

MIN is concerned with ranges of $-8 \leq a < 8$ and $-8 \leq b < 8$.

Figure 5B:
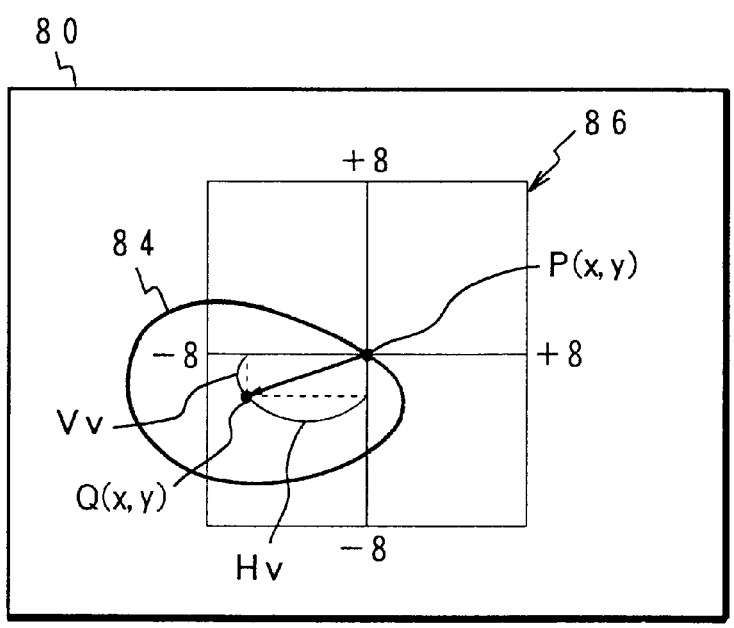

The motion vector of each subblock is calculated by the equation (1). FIGS. 5A and 5B are explanatory diagrams of the equation (1) for calculating the motion vector by the correlation arithmetic operation of the differences. When attention is paid to one subblock 86 in a previous frame image 78 in FIG. 5A, there is a previous frame object image 82 in the subblock 86. A present frame image 80 after a 1-frame period is shown in FIG. 5B under the previous frame image 78. The position of the previous frame object image 82 in FIG. 5A existing in the same subblock 86 is moved as shown by a present frame object image 84 in FIG. 5B due to the elapse of the time of 1-frame period. If the calculation of the minimum value (bg) of the differences between the subblock 86 in the previous frame image 78 and the subblock 86 in the present frame image 80 is performed by the equation (1), a pixel position A(x, y) where the minimum value (bg) obtained by the arithmetic operation with the one-preceding frame image of the previous frame image 78 has been calculated is moved to a position P(x, y) where the minimum value (bg) has been obtained in the arithmetic operation with the present frame image 80. When the arithmetic operation of the equation (1) will be specifically explained, B(x, y) of the second term of the right side is, for instance, P(x, y) in the subblock 86 in the previous frame image 78 in FIG. 5A. A(x+a, y+b) of the first term of the right side in the equation (1) indicates a value corresponding to all pixels included in the subblock 86 in which a and b are respectively changed from −8 to +8 by setting P(x, y) in the subblock 86 in the present frame image 80 to an origin. Thus, the equation (1) is a difference correlation arithmetic operation such that while the previous frame object image 82 is scanned every pixel position of the subblock 86 in the present frame image 80, its minimum value is obtained. When the previous frame object image 82 is scanned to the position where it coincides with the present frame object image 84, namely, at Q(x, y), the minimum value (bg) is obtained. Therefore, the motion vector of the subblock 86 can be calculated as a vector V showing the movement of the present frame image 80 from P(x, y) of the previous frame image 78 to Q(x, y) of the present frame image 80. The motion vector V can express its magnitude and direction by a vector component Hv in the horizontal direction and a vector component Vv in the vertical direction.

With respect to the frame image of FIG. 4, the calculation of the equation (1), namely, the calculation of the motion vectors as shown in FIGS. 5A and 5B is performed with regard to all of the blocks, and the horizontal vector component Hv and vertical vector component Vv of each motion vector are calculated every subblock. Specifically speaking, the horizontal vector component Hv and vertical vector component Vv of each motion vector are obtained by the following equations, because they have values of a and b which presented the minimum difference value (bg) in the equation (1) as shown in FIGS. 5A and 5B.

$$Hv=(a) \text{ which presented the minimum difference value bg}$$
$$Vv=(b) \text{ which presented the minimum difference value bg} \quad (2)$$

Although the motion vector of the subblock can be detected by the equations (1) and (2), further, in the invention, a reliability amount (bgm) of the motion vector is calculated in order to prevent an erroneous detection due to noises of the image, a shadow of the vehicle, further, headlights, or the like. First, a sum (bg0) of the differences of the subblocks is calculated by the following equation with respect to the same subblocks in the present frame and the previous frame.

$$bg0 = \Sigma |f(x, y) - g(x, y)| \quad (3)$$

where, the sum $\Sigma$ is concerned with all of the pixel positions (x, y) in the subblock If the difference sum (bg0) of the same subblock can be calculated, it is subtracted from the minimum difference value (bg) calculated by the equation (1) and a resultant value is set to a reliability amount (bgm) of the motion vector. That is, the reliability amount (bgm) of the motion vector is calculated by the following equation.

$$bgm = bg - bg0 \quad (4)$$

If the motion vector and the reliability amount (bgm) of the motion vector can be calculated as mentioned above, all of the subblocks are scanned, the vehicle is detected on the basis of the presence or absence of the group of blocks which satisfy the following conditions and, at the same time, the license plate area at the head of the vehicle is detected.

(I) It is a set of subblocks having a size similar to that of the license plate.

(II) It is a set of subblocks in which the directions and sizes of the vector components Hv and Vv of the motion vectors are almost equal, respectively.

(III) It is a set of subblocks in which the reliability amount (bgm) of the motion vector is equal to or larger than the luminance level (bg_th) obtained when the vehicle detection is not performed on the basis of the image in the luminance measuring area 68 in FIG. 4.

Those searching conditions will be summarized. The vehicle is detected in the case where all blocks are scanned, they are the group of blocks which exist in the area of the rectangular size corresponding to the license plate and in which the sizes and directions of the motion vectors are almost equal, and the vector reliability amount bgm of each block is equal to or larger than the luminance level (bg_th). At the same time, this subblock group is detected as a license plate area of the head of the vehicle. In the present frame image 66 in FIG. 4, the motion detected subblocks which satisfy the equations (1) to (4) and their discriminating conditions are set to subblocks 74. In the example, as subblocks 74, ten subblocks are obtained in the license plate 72. The motion can be detected by the 10 subblocks of the license plate 72. In addition, a license plate area 76 surrounded by a dotted line can be recognized. Also with respect to the portions of, for example, the headlights, front portion, and further, wheels other than the license plate 70, the subblocks 74 which satisfy the discriminating conditions concerning the motion exist. However, since a predetermined number of, for example, five or more subblocks which satisfy the discriminating conditions do not exist in the rectangular area corresponding to the license plate 72, it is not determined that there is a motion of the license plate area 76 of the head of the vehicle.

Figure 6:
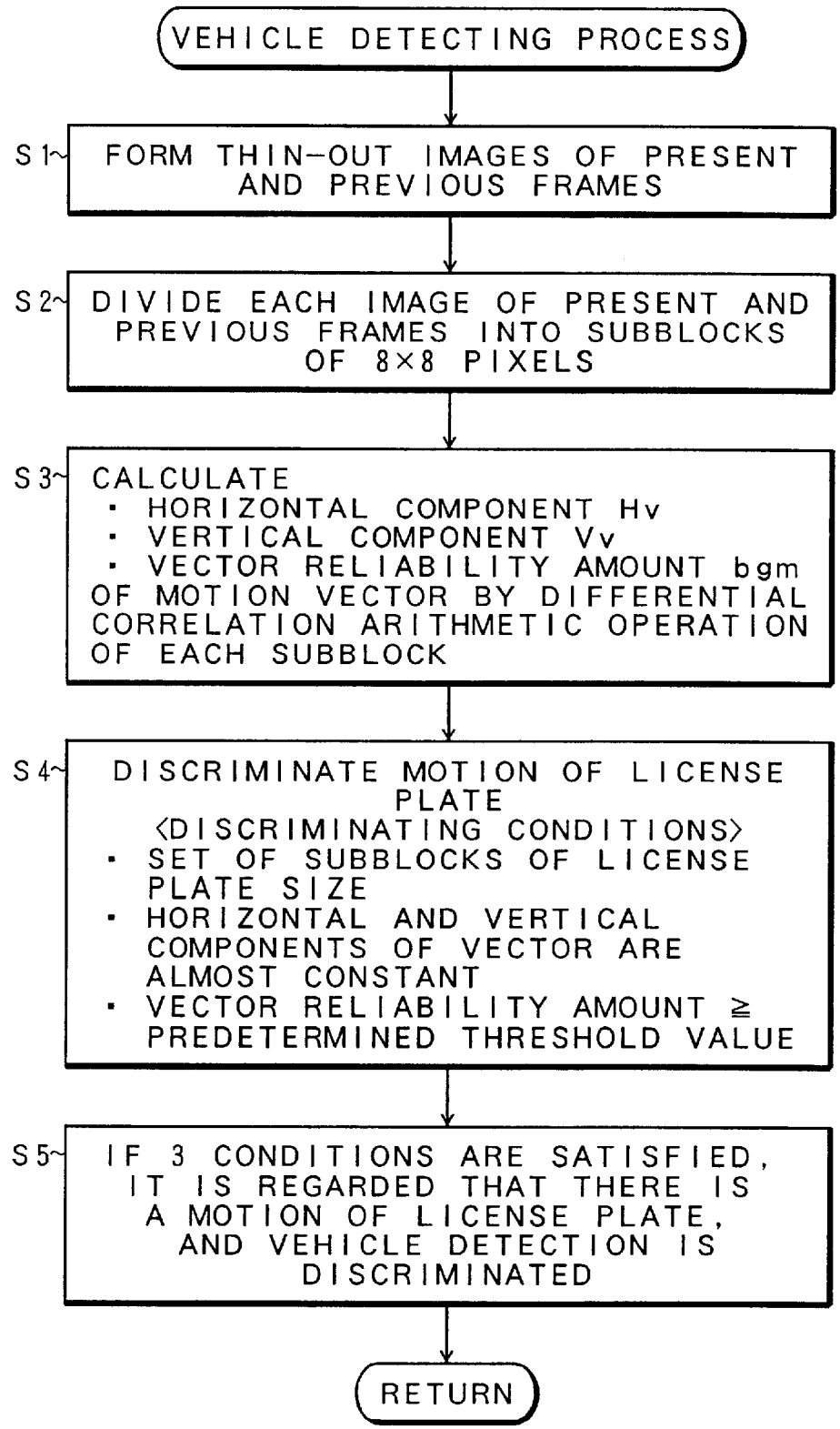
FIG. 6 is a flowchart for a vehicle detecting process according to the invention.

FIG. 6 is a flowchart for the vehicle detecting process shown in step S3 in FIG. 3. In the vehicle detecting process, thin-out images of the present frame and previous frame are formed in step S1. Subsequently, in step S2, each of the images of the present frame and previous frame is divided into subblocks of, for example, 8×8 pixels. In step S3, the presence or absence of each of the horizontal and vertical components of the motion vector based on the difference correlation arithmetic operation of each subblock and, further, the presence or absence of the reliability amount (bgm) according to the equations (1) to (4) are calculated. In step S4, all subblocks are scanned as motion conditions of the license plate and the subblocks are searched under the conditions such that they are a set of subblocks having a size similar to the size of license plate, the directions and sizes of the horizontal and vertical components of the vectors are constant, and the vector reliability amount (bgm) is equal to or larger than the threshold value (bg_th) obtained as a luminance level. If the above three conditions are satisfied in step S5 with respect to the searched subblocks, it is regarded that there is a motion of the license plate. The detection of the vehicle and the detection of the license plate area at the head of the vehicle are discriminated.

Figure 7:
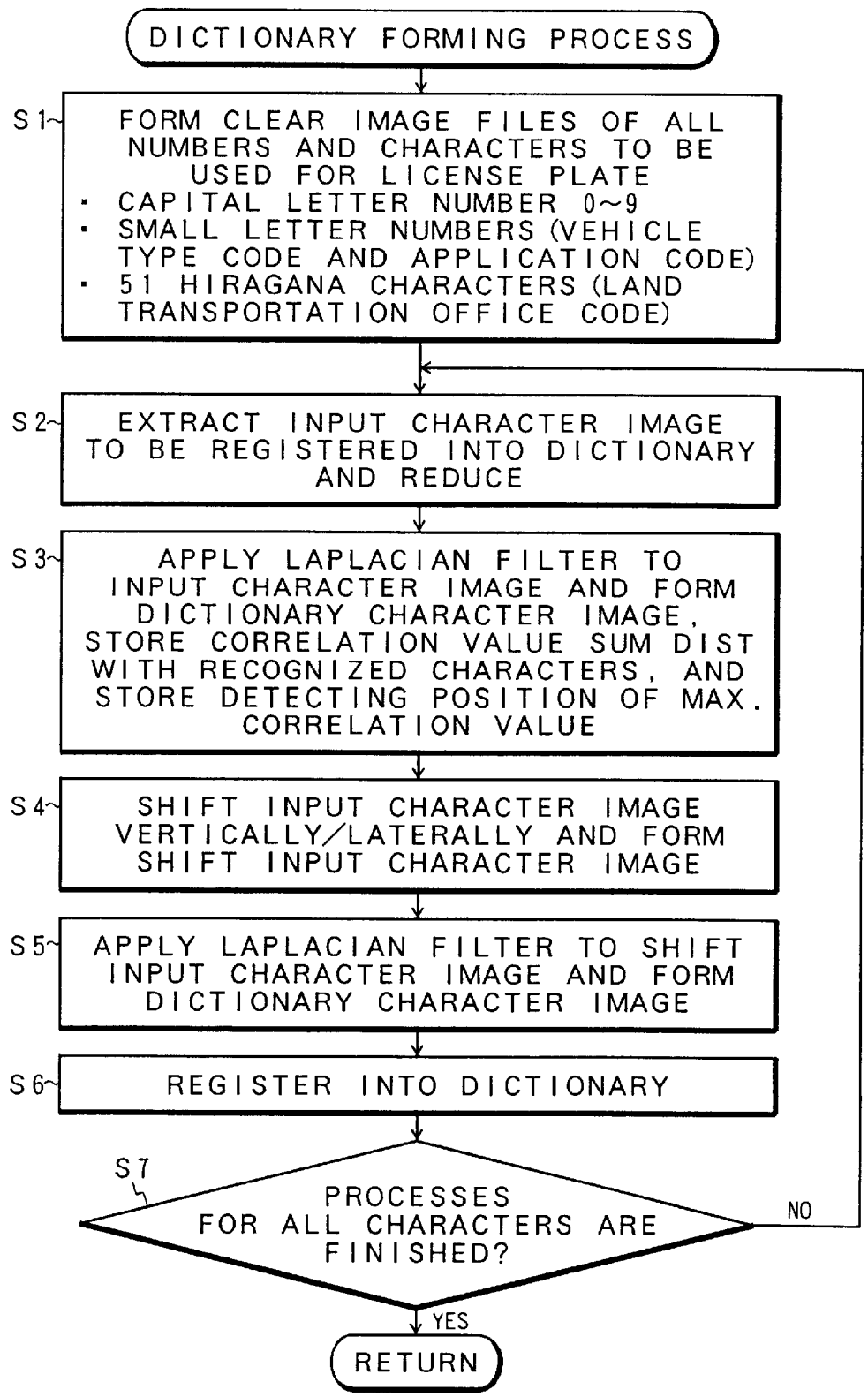
FIG. 7 is a flowchart for a dictionary forming process according to the invention.
Figures 8A, 8B:
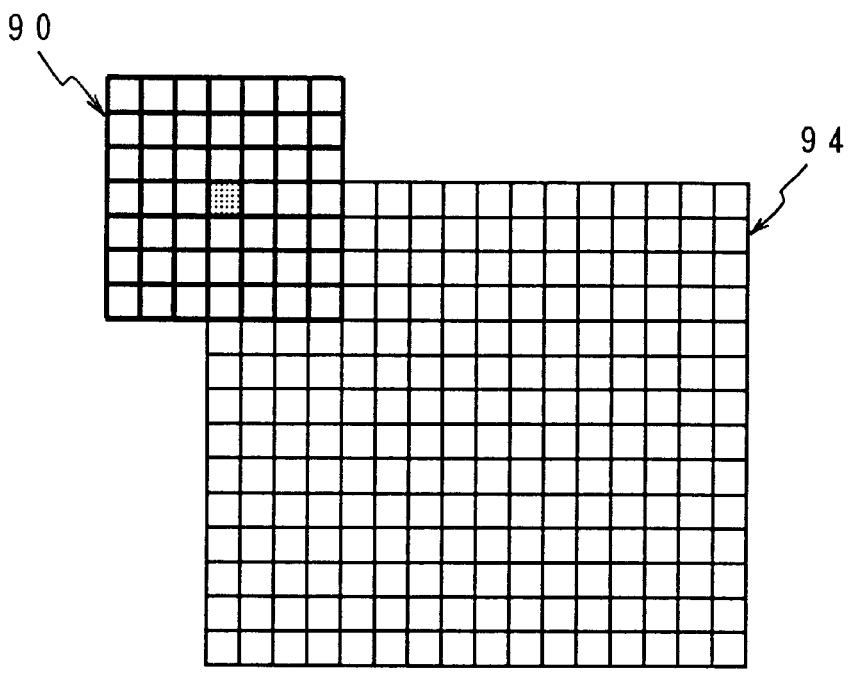
FIGS. 8A and 8B are explanatory diagrams of a Laplacian filter which is used for dictionary formation of numbers of a large size of the license plate.

The character recognizing process of the license plate in the invention will now be described. In the character recognizing process, first, it is necessary to prepare each of the low resolution Laplacian character image dictionary 38 and high resolution Laplacian character image dictionary 40 as a dictionary image into the dictionary image memory 20 in FIG. 1. FIG. 7 is a flowchart for the dictionary forming process by the dictionary managing unit 22 in FIG. 1. In the dictionary forming process, clear image files of all of the numerals and characters which are used for the license plate are formed in step S1. Upon formation of the image files, a license plate as a sample or numerals which are used for the license plate are prepared and clear image files photographed by the TV camera 12 are formed. As character images which are formed as image files, there are numerals of small characters, 51 Hiragana characters, and the like which are used for the codes other than the numerals 0 to 9 of large characters having a large size which are used for the license plate numerals 58 in FIG. 2 and the license plate numerals 58. In step S2, an extraction to specify the area of the input character image to be registered into the dictionary is performed and the extracted image is reduced to the pixel size which appears on the screen when the license plate is photographed by the actual TV camera 12. In step S3, the extracted and reduced input character image (sample character image) is converted by applying a Laplacian filter, thereby forming a dictionary character image. When the dictionary character image is formed by applying the Laplacian filter in step S3, a Laplacian filter 90 having a structure of FIG. 8A is used with regard to the license plate numerals 58 of the large size in FIG. 2. The Laplacian filter 90 has a filter structure of 7 pixels (in the vertical direction)×7 pixels (in the lateral direction) having an area of ±3 pixels for a center core 92. FIG. 8B is an explanatory diagram for a converting process in the case where the Laplacian filter 90 is applied to a character image 94. For example, if the user tries to start a Laplacian conversion from the pixel at the upper left corner of the character image 94, the core 92 of the Laplacian filter 90 is positioned to this head pixel and a Laplacian applied image is calculated in accordance with the following equation between the core 92 and the pixel at the position corresponding to the Laplacian filter 90. That is, when the present image is assumed to be C and the Laplacian applied image is assumed to be D, the Laplacian applied image D is calculated by the following equation.

$$D(x, y)=C(x, y)-\frac{1}{48} \times \Sigma C(x+a, y+b) \tag{5}$$

where, $-3 \leq a \leq 3$, $-3 \leq b \leq 3$, $(a, b) \neq (0, 0)$

Such an arithmetic operating process of the Laplacian applied image is executed with respect to all pixels while scanning the position of the core 92 of the Laplacian filter 90 in the horizontal and vertical directions from the head pixel at the upper left corner with regard to the character image 94.

Figures 9A, 9B:
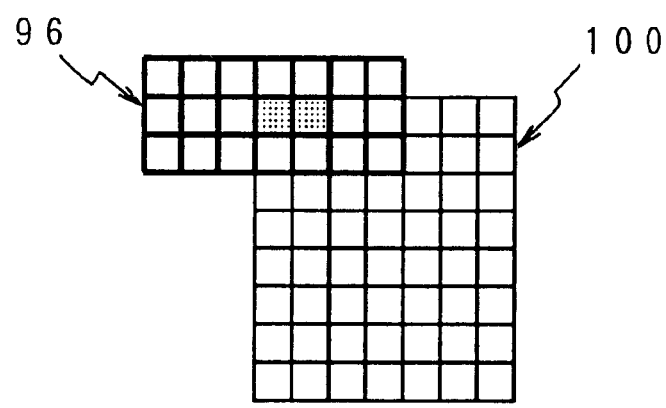
FIGS. 9A and 9B are explanatory diagrams of a Laplacian filter which is used for dictionary formation of a Hiragana of a small size of the license plate.

FIGS. 9A and 9B are explanatory diagrams of a Laplacian filter which is used for forming the dictionary of the character of each code having a small size in FIG. 2 and its converting process. FIG. 9A shows a Laplacian filter 96 which is used for code characters having a small size on the license plate. As compared with the Laplacian filter 90 for use in registration of the license plate numerals into the dictionary in FIG. 8A, the filer 96 has two cores 98-1 and 98-2 and is constructed by 3 pixels (in the vertical direction)×7 pixels (in the lateral direction), namely, its filter size is reduced to ½ in the vertical direction. That is, if the Laplacian filter 90 for use in conversion of the license plate numerals of a large size in FIG. 8A is used for the Laplacian conversion of the code characters of a small size, no high frequency component remains. Therefore, in order to reduce the vertical size as shown in FIG. 9A and suppress the influence of noises corresponding to the reduced size, the Laplacian filter 96 using the two cores 98-1 and 98-2 in which the size is doubled is used, so that it is possible to realize the Laplacian conversion for enabling the high precision recognition at a low resolution in the recognition of the code characters of the small size to be performed. FIG. 9B shows a state of the Laplacian conversion for a small character image 100 of a small size using the Laplacian filter 96. Naturally, the structure of the Laplacian filter is not limited to the structure of each of FIGS. 8A and 9A but an optimum filter structure adapted to the size of character as a recognition target which enables the high precision recognition at a low resolution to be performed can be used as necessary.

Referring again to FIG. 7, if a dictionary character image is formed by applying the Laplacian filter with respect to the numerals having a large size and the characters for codes having a small size of the license plate in step S3, a sample character which was inputted and whose size was reduced is shifted vertically and laterally with respect to the characters having a small size which are used for the license plate, thereby forming a shift input character image in next step S4. FIG. 10 shows a specific example of a shift character image with respect to the sample character image and Hiragana "ぬ" of Japanese is illustrated as an example. First, in a sample character image 102 located at the center, "ぬ" is arranged at the center of a character area. With respect to the sample character image 102, the portion of the character image in the character area is shifted by a predetermined number of dots in eight directions of the upper, upper left, left, lower left, lower, lower right, right, and upper right directions, thereby forming shift input character images 102-1 to 102-8, respectively. In step S5 in FIG. 7, the shift input character images 102-1 to 102-8 obtained as mentioned above are also converted into Laplacian character images by applying, for example, the Laplacian filter 96 having the structure of FIGS. 9A and 9B and registered into the dictionary. With respect to the code characters which are used for the license plate, since the process by the high resolution recognizing unit 54 in FIG. 1 is executed, the character images of a high resolution which are not thinned out are processed as targets with regard to the character images to be registered into the dictionary. Subsequently, in the dictionary forming process in FIG. 7, the dictionary character image after completion of the Laplacian conversion are registered in the dictionary in step S6. Such a process is repeated until the processes are finished for all of the characters in step S7.

Figure 11:
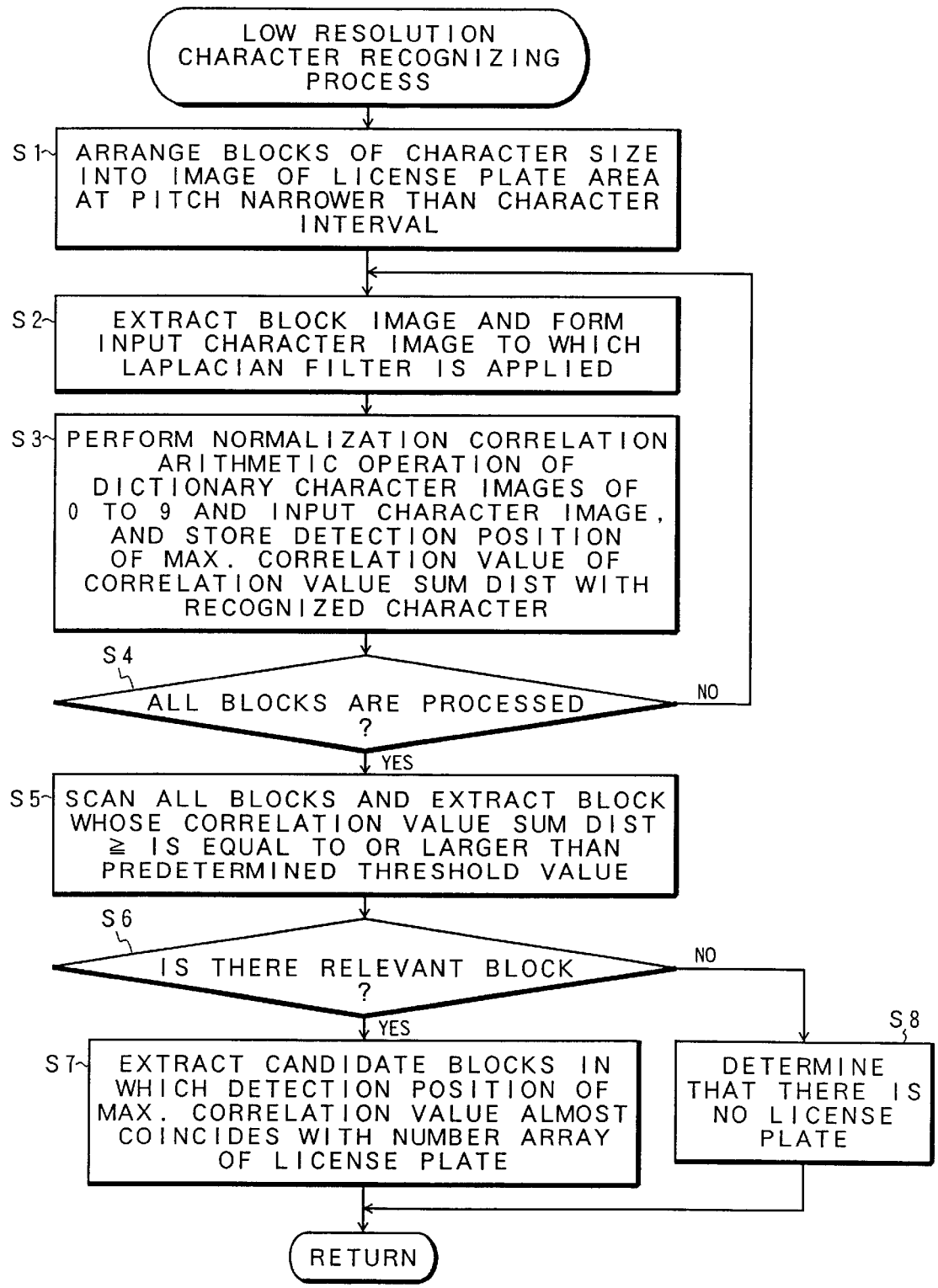
FIG. 11 is a flowchart for a low resolution character recognizing process according to the invention.

The character recognizing process after the formation of the dictionary in the invention will now be separately described with respect to the low resolution recognizing process and high resolution recognizing process. FIG. 11 is a flowchart for the low resolution character recognizing process by the low resolution recognizing unit 52 provided in the character recognizing unit 26 in FIG. 1 with respect to the license plate numerals 58 having a large size in the license plate 56 in FIG. 2 as targets. The low resolution character recognizing process is executed after the license plate area in the vehicle detecting process in FIG. 6 was recognized. First, in step S1, with respect to, for example, the image in the license plate area 76 in FIG. 4 recognized by the vehicle detecting process as a target, the blocks having the character size of the license plate numerals on the frame image are arranged at a pitch narrower than a character interval of the license plate numerals. That is, as shown in FIG. 12, blocks 104-1 to 104-n having the size of the license plate numerals on the image for the license plate area 76 are similarly arranged, for example, from the upper left corner to the vertical and lateral directions at a pitch p narrower than the character interval of the license plate numerals on the frame image. Subsequently, in step S2, block images are extracted in order from the block 104-1 to the last block 104-n arranged as shown in FIG. 12, thereby forming an input character image by applying the Laplacian filter 90 with the structure of FIGS. 8A and 8B, namely, by performing the arithmetic operation of the equation (5).

In step S3, a normalization correlation arithmetic operation is performed between the dictionary character image in the low resolution Laplacian character image dictionary 38 registered in the dictionary image memory 20 in FIG. 1 and the input character image obtained after completion of the Laplacian conversion, and the detecting position of the maximum correlation value of the sum of the correlation values with the recognition characters is stored. Assuming that the dictionary image is set to f and the input image is set to g, this normalization correlation arithmetic operation is executed by the following equation.

$$\text{dist} = \max \left| \frac{\sum (f(x, y)g(x, y))}{\sqrt{\sum f(x, y)^2 \sum g(x, y)^2}} \right| \quad (6)$$

The sum in the equation (6) is concerned with the number of dots of the character size in each of the blocks 104-1 to 104-n. The processes in steps S2 and S3 are executed with respect to all blocks in step S4. When the processes are finished, step S5 follows and all blocks in FIG. 10 are scanned. The blocks in which a correlation value sum (dist) of the block calculated by the equation (6) is equal to or larger than a predetermined threshold value are extracted. If there is the block in which the sum (dist) is equal to or larger than the threshold value in step S6, candidate blocks in which the detecting position of the maximum correlation value almost coincides with the array of the license plate numerals are extracted as recognition candidate characters in step S7. If the block in which the sum (dist) is equal to or larger than the threshold value is not extracted in step S6, it is determined in step S8 that there is no license plate.

The high resolution character recognizing process will now be described with reference to a flowchart of FIG. 13. First, in step S1, the images of the candidate blocks obtained as a processing result of the low resolution character recognizing process in FIGS. 9A and 9B are returned to the original resolution. Subsequently, in step S2, a contrast adjusting process is executed. The contrast adjusting process is as shown in a flowchart of FIG. 14. First, in step S1, only in case of reading a license plate whose background color is white, an average of the luminance of the background of the license plate is obtained and an accumulation average in a predetermined time is set to a white level W. Subsequently, in step S2, whether the white level W in the license plate area to be subjected to the high resolution character recognizing process is equal to or lower than a threshold value Wth or not is discriminated. If it is equal to or less than the threshold value Wth, the pixel luminance of the candidate blocks is multiplied by (Wth/W), thereby enhancing the contrast in step S3. When the image before the conversion is assumed to be H and the image after the conversion is assumed to be I, an arithmetic operation to enhance the contrast is calculated by the following equation.

$$I(x, y) = H(x, y) \times W\text{th}/W \quad (7)$$

Figure 13:
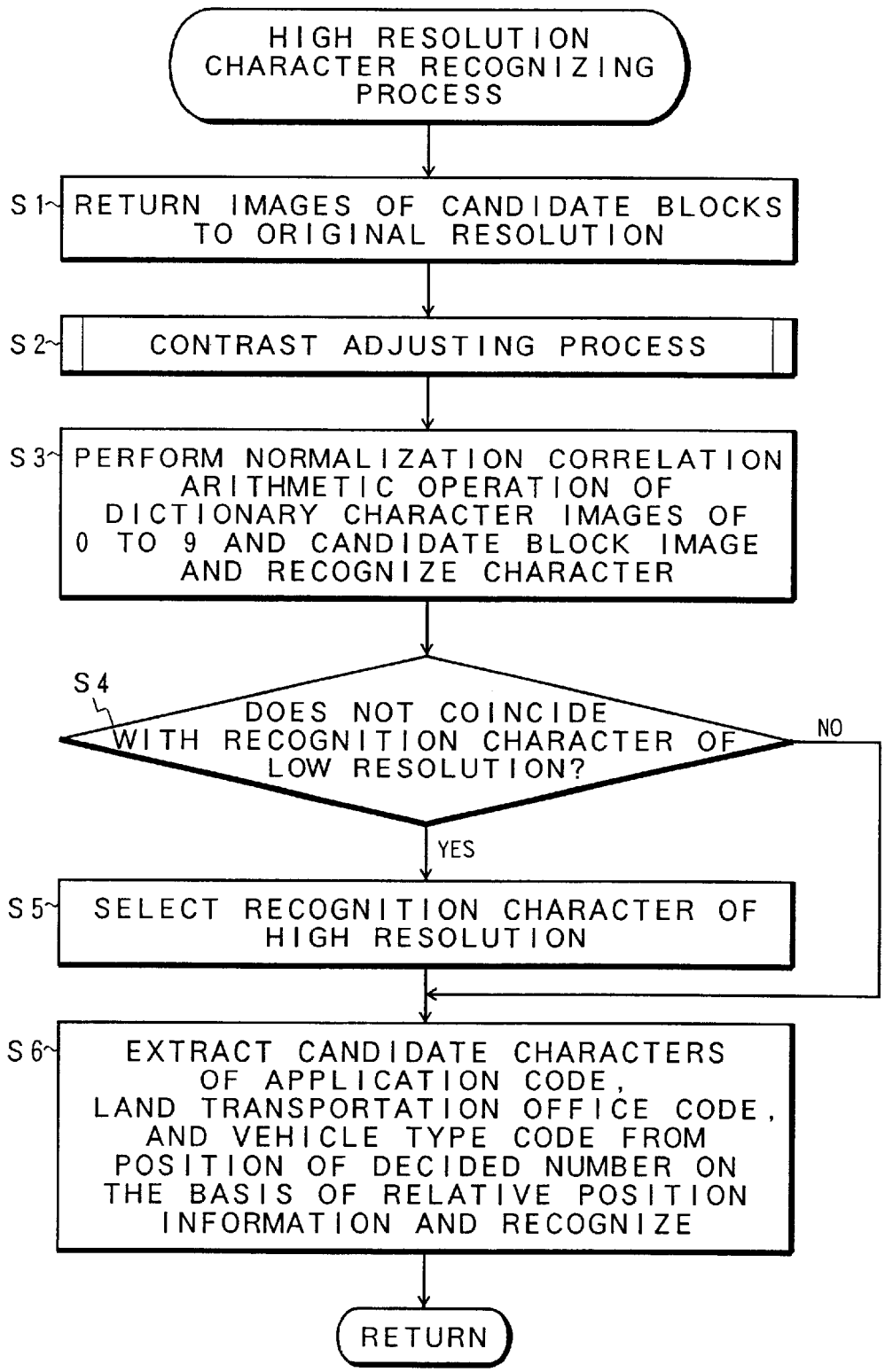
FIG. 13 is a flowchart for a high resolution character recognizing process according to the invention.
Figure 14:
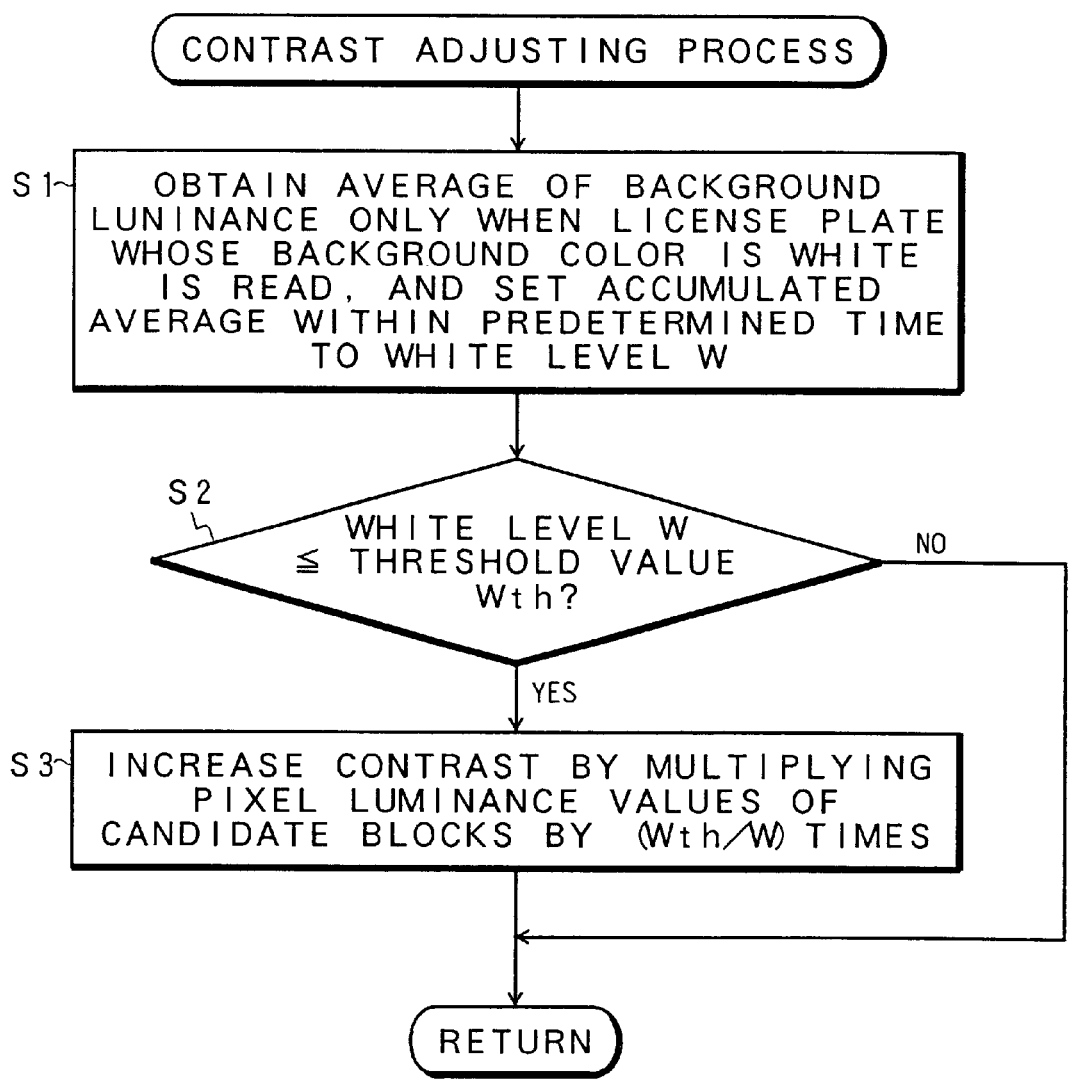
FIG. 14 is a flowchart for a contrast adjusting process in FIG. 13.

When the contrast adjusting process in step S2 in FIG. 13 is finished, step S3 follows. A normalization correlation arithmetic operation between the dictionary character images of 0 to 9 in the high resolution Laplacian character image dictionary 40 stored in the dictionary image memory 20 in FIG. 1 and the candidate block images is executed by the equation (6), thereby recognizing the characters. With respect to a result of the character recognition, whether the character is not matched with the recognition character of a low resolution or not is discriminated in step S4. If it is not matched, the recognition character of a high resolution is selected in step S5. Thus, even if an erroneous detection was performed in the character recognition of the low resolution, the correct character recognition can be performed on the basis of the character detection of the high resolution. Subsequently, in step S6, for the position of the decided license plate numerals, since the relative positions of the other code characters have previously been determined as shown in the license plate 56 in FIG. 2, candidate characters of the application code, land transportation branch office code, and vehicle type code are extracted on the basis of the relative position information and the normalization correlation arithmetic operation with the dictionary images based on the equation (6) is performed, thereby recognizing the characters. As dictionary characters in this case, the Laplacian filter 96 having the structure of FIG. 8A is used. That is, the character images of the application code, land transportation branch office code, and vehicle type code extracted from the relative position information are converted into Laplacian character images by applying the Laplacian filter 96 of FIG. 8A. The characters of the small size of the license plate are recognized by the normalization correlation arithmetic operation of the equation (6) using those Laplacian character images and the Laplacian character images registered in the dictionary.

FIGS. 15A, 15B, 15C, and 15D show other examples of the license plate as a target to be read by the license plate reading apparatus of the invention. That is, FIG. 2 shows the example of the license plate which is used in Japan. FIG. 15A shows the license plate of U.S.A., FIG. 15B shows the license plate of Germany, FIG. 15C shows the license plate of Sweden, and FIG. 15D shows the license plate of Korea. Even in those license plates, as license plate characters, alphabets and numerals are used as characters of a large size. Even with respect to such license plates, the character numerals of the license plate can be recognized at a high precision from a motion image photographed by the TV camera 12 of a relatively low resolution according to the license plate reading apparatus 10 of the invention.

As mentioned above, according to the invention, the license plate can be recognized at a high precision even for the image of a relatively low resolution photographed by one TV camera in a sight that is about twice as wide as the width of standard automobile. Even in the case where the external illuminance decreases due to a change in time zone or weather and the contrast in the license plate portion decreases, by automatically correcting the contrast and, further, the normalization correlation arithmetic operation to the fluctuation of the luminance, the license plate can be stably recognized.

The invention is not limited to the foregoing embodiment but incorporates many modifications and variations without losing the objects and advantages of the invention. The invention is not limited by the numerical values shown in the embodiment.

What is claimed is:

1. A license plate reading apparatus comprising:

an image pickup unit, provided above a road, to photograph a running vehicle at a predetermined frame period;

an image storing unit to successively store two images of a present frame image and a previous frame image photographed by said image pickup unit;

a vehicle detecting unit to detect a motion of a license plate in a front portion of said running vehicle on the basis of a difference between the present frame image and the previous frame image stored in said image storing unit;

a dictionary in which character images of all characters used for the license plate have been registered; and a character recognizing unit to recognize all of the characters on the license plate from an image in a license plate area detected by said vehicle detecting unit by collating with the character images registered in said character image dictionary, wherein said vehicle detecting unit comprises:

a block dividing unit to divide each of said present frame image and said previous frame image into blocks of a predetermined pixel size;

a vector calculating unit to calculate a motion vector of the block by obtaining a pixel position, as a block moving position, in which a sum of differences between each pixel in the block of said previous frame image and all pixels in the block of said present frame image becomes the minimum; and a vehicle head detecting unit to scan all of the blocks, to search a group of blocks in which sizes and directions of the motion vectors are almost the same in an area of a rectangular size corresponding to the license plate, to detect the vehicle on the basis of the presence or absence of said group of blocks which satisfy said conditions, and at the same time, to detect a license plate area at the head of the vehicle.

2. A license plate reading apparatus comprising:

an image pickup unit, provided above a road, to photograph a running vehicle at a predetermined frame period;

an image storing unit to successively store two images of a present frame image and a previous frame image photographed by said image pickup unit;

a vehicle detecting unit to detect a motion of a license plate in a front portion of said running vehicle on the basis of a difference between the present frame image and the previous frame image stored in said image storing unit;

a dictionary in which character images of all characters used for the license plate have been registered; and a character recognizing unit to recognize all of the characters on the license plate from an image in a license plate area detected by said vehicle detecting unit by collating with the character images registered in said character image dictionary wherein said vehicle detecting unit comprises:

a block dividing unit to divide each of said present frame image and said previous frame image into blocks of a predetermined pixel size;

a luminance level threshold value setting unit to always measure a luminance in a predetermined area on the road in said frame image, to obtain an average value for a predetermined time to thereby discriminate a statistical external illuminance state, to obtain a luminance level threshold value which increases monotonously in accordance with said illuminance state by a predetermined simple increasing curve, and to set said luminance level threshold value;

a vector calculating unit to calculate a motion vector of the block by obtaining a pixel position, as a block moving position, in which a sum of differences between each pixel in the block of said previous frame image and all pixels in the block of said present frame image becomes the minimum;

a reliability amount calculating unit to calculate a motion vector reliability amount by subtracting the sum of the differences between each pixel in the block of the present frame image and all pixels in the block of said previous frame image from a minimum difference value calculated by said vector calculating unit; and a vehicle head detecting unit to scan all of the blocks, to search a group of blocks in which sizes and directions of the motion vectors are almost the same and said reliability amount is equal to or larger than said luminance level threshold value in an area of a rectangular size corresponding to the license plate, to detect the vehicle on the basis of the presence or absence of said group of blocks which satisfy said conditions, and at the same time, to detect a license plate area at the head of the vehicle.

3. A license plate reading apparatus comprising:

an image pickup unit, provided above a road, to photograph a running vehicle at a predetermined frame period;

an image storing unit to successively store two images of a present frame image and a previous frame image photographed by said image pickup unit;

a vehicle detecting unit to detect a motion of a license plate in a front portion of said running vehicle on the basis of a difference between the present frame image and the previous frame image stored in said image storing unit;

a dictionary in which character images of all characters used for the license plate have been registered; and a character recognizing unit to recognize all of the characters on the license plate from an image in a license plate area detected by said vehicle detecting unit by collating with the character images registered in said character image dictionary;

wherein said character recognizing unit comprises:
  a low resolution recognizing unit to recognize a character at a position of the character having the largest size on the license plate with respect to a frame image of a low resolution, as a target, obtained by thinning out an original image; and
  a high resolution recognizing unit to restore said frame image to an original resolution, to recognize the character at the character position recognized by said low resolution recognizing unit, and to recognize another character at a position of the character having a small size on the license plate where a relative position has previously been known on the basis of a result of said character recognition.

4. An apparatus according to claim 3, wherein in said dictionary, a sample character image obtained by photographing each character which is used for the license plate, is registered, and each of said sample character images is reduced to an image corresponding to a size of character image at the time of reading the license plate by thinning out said image to an image of a same resolution as that of said low resolution recognizing unit and, thereafter, converted into a Laplacian character image by applying a Laplacian filter, and registered, and each of said low resolution recognizing unit and said high resolution recognizing unit converts an inputted character image into the image by applying the Laplacian filter and, thereafter, performs a normalization correlation arithmetic operation between said converted image and said Laplacian character image of the corresponding resolution which has been registered in the dictionary, thereby recognizing the characters of the license plate.

5. A license plate reading method comprising:

a dictionary forming step of forming a dictionary in which character images of all characters used for a license plate have been registered;

an image pickup step of photographing a running vehicle at a predetermined frame period from a position above a road;

an image storing step of successively storing two images of a present frame image and a previous frame image photographed in said image pickup step;

a vehicle detecting step of detecting a motion of the license plate in a front portion of said running vehicle on the basis of a difference between the present frame image and the previous frame image stored by said image storing step; and a character recognizing step of recognizing all of the characters on the license plate from an image in a license plate area detected in said vehicle detecting step by collating with the character images registered in said dictionary;

wherein said vehicle detecting step comprises:
  a block dividing step of dividing each of said present frame image and said previous frame image into blocks of a predetermined pixel size;
  a vector calculating step of calculating a motion vector of the block by obtaining a pixel position, as a block moving position, in which a sum of differences between each pixel in the block of said previous frame image and all pixels in the block of said present frame image becomes the minimum; and
  a vehicle head detecting step of scanning all of the blocks, searching a group of blocks in which sizes and directions of the motion vectors are almost the same in an area of a rectangular size corresponding to the license plate, detecting the vehicle on the basis of the presence or absence of said group of blocks which satisfy said conditions, and at the same time, detecting a license plate area at the head of the vehicle.

6. A license plate reading method comprising:

a dictionary forming step of forming a dictionary in which character images of all characters used for a license plate have been registered;

an image pickup step of photographing a running vehicle at a predetermined frame period from a position above a road;

an image storing step of successively storing two images of a present frame image and a previous frame image photographed in said image pickup step;

a vehicle detecting step of detecting a motion of the license plate in a front portion of said running vehicle on the basis of a difference between the present frame image and the previous frame image stored by said image storing step; and a character recognizing step of recognizing all of the characters on the license plate from an image in a license plate area detected in said vehicle detecting step by collating with the character images registered in said dictionary;

wherein said vehicle detecting step comprises:
  a block dividing step of dividing each of said present frame image and said previous frame image into blocks of a predetermined pixel size;
  a luminance level threshold value setting step of always measuring a luminance in a predetermined area on the road in said frame image, obtaining an average value for a predetermined time to thereby discriminate a statistical external illuminance state, obtaining a luminance level threshold value which increases monotonously in accordance with said illuminance state by a predetermined simple increasing curve, and setting said luminance level threshold value;
  a vector calculating step of calculating a motion vector of the block by obtaining a pixel position, as a block moving position, in which a sum of differences between each pixel in the block of said previous frame image and all pixels in the block of said present frame image becomes the minimum;

a reliability amount calculating step of calculating a motion vector reliability amount by subtracting the sum of the differences between each pixel in the block of the present frame image and all pixels in the block of said previous frame image from a minimum difference value calculated by said vector calculating unit; and a vehicle head detecting step of scanning all of the blocks, searching a group of blocks in which sizes and directions of the motion vectors are almost the same and said reliability amount is equal to or larger than said luminance level threshold value in an area of a rectangular size corresponding to the license plate, detecting the vehicle on the basis of the presence or absence of said group of blocks which satisfy said conditions, and at the same time, detecting a license plate area at the head of the vehicle.

7. A license plate reading method comprising:

a dictionary forming step of forming a dictionary in which character images of all characters used for a license plate have been registered;

an image pickup step of photographing a running vehicle at a predetermined frame period from a position above a road;

an image storing step of successively storing two images of a present frame image and a previous frame image photographed in said image pickup step;

a vehicle detecting step of detecting a motion of the license plate in a front portion of said running vehicle on the basis of a difference between the present frame image and the previous frame image stored by said image storing step; and a character recognizing step of recognizing all of the characters on the license plate from an image in a license plate area detected in said vehicle detecting step by collating with the character images registered in said dictionary;

wherein said character recognizing step comprises:

a low resolution recognizing step of recognizing a character at a position of the character having the largest size on the license plate with respect to a frame image of a low resolution, as a target, obtained by thinning out an original image; and a high resolution recognizing step of restoring said frame image to an original resolution, recognizing the character at the character position recognized in said low resolution recognizing step, and recognizing another character at a position of the character having a small size on the license plate where a relative position has previously been known on the basis of a result of said character recognition.

8. A method according to claim 7, wherein in said dictionary forming step, a sample character image obtained by photographing each character which is used for the license plate, is registered in said dictionary, and each of said sample character images is reduced to an image corresponding to a size of character image at the time of reading the license plate by thinning out said image to an image of a same resolution as that in said low resolution recognizing step and, thereafter, converted into a Laplacian character image by applying a Laplacian filter, and registered in said dictionary, and in each of said low resolution recognizing step and said high resolution recognizing step, an inputted character image is converted into the image by applying the Laplacian filter and, thereafter, a normalization correlation arithmetic operation is performed between said converted image and said Laplacian character image of the corresponding resolution which has been registered in said dictionary, thereby recognizing the characters of the license plate.

* * * * *

UNITED STATES PATENT AND TRADEMARK OFFICE
CERTIFICATE OF CORRECTION

PATENT NO.     : 6,754,369 B1
DATED          : June 22, 2004
INVENTOR(S)    : Shinichi Sazawa It is certified that error appears in the above-identified patent and that said Letters Patent is hereby corrected as shown below:

<u>Title page,</u>
Item [*] Notice, the Patent Term Adjustment is -- 536 day(s) --.

Signed and Sealed this

Ninth Day of November, 2004

JON W. DUDAS
*Director of the United States Patent and Trademark Office*